(12) United States Patent
Kamiyama et al.

(10) Patent No.: US 6,254,709 B1
(45) Date of Patent: Jul. 3, 2001

(54) METHOD OF MANUFACTURING A PIPE LINER BAG

(75) Inventors: Takao Kamiyama, Hiratsuka; Yasuhiro Yokoshima, Ibaraki-Ken; Shigeru Endoh, Yasato; Hiroyuki Aoki, Tokorozawa, all of (JP)

(73) Assignees: Shonan Gosei-Jushi Seisakusho K.K., Hiratsuka; Yokoshima & Company, Ibaraki-ken; GET Inc., Tsukuba; OAR Company, Tokorozawa, all of (JP)

( * ) Notice: Subject to any disclaimer, the term of this patent is extended or adjusted under 35 U.S.C. 154(b) by 0 days.

(21) Appl. No.: 09/422,302

(22) Filed: Oct. 21, 1999

(30) Foreign Application Priority Data

Oct. 26, 1998 (JP) .................................. 10-303728

(51) Int. Cl.[7] ................. B32B 7/04; B32B 7/08; F16L 55/18
(52) U.S. Cl. ................ 156/91; 156/92; 156/93; 156/94; 156/148; 138/97
(58) Field of Search ............. 156/91–95, 148, 156/217, 218, 227, 287–286, 293–294, 303.1, 304.1; 138/97–98; 428/34.1, 34.5, 34.7, 34.6, 35.7, 36.1, 36.5, 36.6

(56) References Cited

U.S. PATENT DOCUMENTS

| 5,242,517 | * | 9/1993 | Endoh | .................................. 156/92 |
| 5,329,063 | | 7/1994 | Endoh . | |
| 5,765,597 | | 6/1998 | Kiest, Jr. et al. . | |

* cited by examiner

*Primary Examiner*—Geoffrey L. Knable
*Assistant Examiner*—Jessica Rossi
(74) *Attorney, Agent, or Firm*—Knobbe, Martens, Olson & Bear, LLP

(57) ABSTRACT

A method of manufacturing a pipe liner bag which is composed of a tubular resin absorbent material having an outer surface covered with a highly air-tight plastic film and a hardenable resin impregnated in the tubular resin absorbent material. The method involves folding a strip-shaped resin absorbent material and aligning both ends thereof in the width direction, straight sewing overlapped portions to form a tubular resin absorbent material while leaving a sewing margin, turning the tubular resin absorbent material inside out such that a previous inner surface thereof appears outside, and welding or adhering a plastic film entirely or partially on the outer surface of the tubular resin absorbent material to air-tight seal the outer surface. The method can reduce a time required for a joining operation and simplifying a sealing operation after both ends of the strip-shaped resin absorbent material have been joined.

6 Claims, 15 Drawing Sheets

METHOD OF MANUFACTURING A PIPE LINER BAG

BACKGROUND OF THE INVENTION

1. Field of the Invention

The present invention relates to a method of manufacturing a pipe liner bag for use in repair of an old pipe.

2. Description of the Related Art

When an underground pipe, such as pipelines and passageways, becomes defective or too old to perform properly, the pipe is repaired and rehabilitated without digging the earth to expose the pipe and disassembling the sections of the pipe. This non-digging method of repairing an underground pipe has been known and practiced commonly in the field of civil engineering. The pipe lining method utilizes a tubular pipe liner bag made of a resin absorbent material impregnated with a hardenable resin, and having the outer surface covered with a highly air-tight plastic film. The tubular pipe liner bag is inserted into a pipe to be repaired by means of a pressurized fluid such that the pipe liner bag is turned inside out as it proceeds deeper in the pipe. Hereinafter, this manner of insertion shall be called "everting". When the entire length of the tubular liner bag is everted (i.e., turned inside out) into the pipe, the everted tubular liner is pressed against the inner wall of the pipe by a pressurized fluid, and the tubular flexible liner is hardened as the hardenable resin impregnated in the liner is heated, which is effected by heating the fluid filling the tubular liner bag. It is thus possible to line the inner wall of the defective or old pipe with a rigid liner without digging the ground and disassembling the pipe sections.

The pipe lining material for use in the foregoing pipe lining method may be manufactured by a method proposed, for example, in Japanese Patent Publication No. 58-33098. Specifically, this method involves abutting both side ends of a strip-shaped resin absorbent material in the width direction, and joining, by lock sewing or zigzag chain sewing, the abutted ends of the strip-shaped resin absorbent material to form a tubular resin absorbent material.

However, the lock sewing or zigzag chain sewing, employed in the conventional manufacturing method, is late in sewing, as compared with straight sewing such as final sewing or through sewing. In addition, since a sewing yarn appears on the surface of a sewed material over a constant width, the sealability cannot be ensured for the joint unless any processing is added thereto. Such sealing processing causes an increased complexity of the manufacturing method.

A pipe liner bag is inflated within a pipe line by the action of a fluid pressure and pressed onto the inner wall of the pipe line. To prevent the pipe liner bag from wrinkling, the pipe liner bag is typically manufactured to have a smaller diameter than that of an intended pipe line. Thus, if the pipe liner bag extended by a fluid pressure is applied with a tension, the sewed portion is extended and reduced in thickness, resulting in an insufficient strength. It is therefore necessary to reinforce the sewed portion of the tubular pipe liner bag by additionally adhering a reinforcing tape or the like thereon.

There has been proposed a method of manufacturing a tubular resin absorbent material by overlapping both end portions in the width direction of a strip-shaped resin absorbent material, and sewing the overlapped end portions by straight sewing such as main sewing, through sewing or the like in order to reduce a time required for a sewing process as well as to narrow a width of the strip-shaped resin absorbent material required for the sewing to simplify a sealing operation for a joint.

With this method, however, a sewing margin remains at the joint on the outer surface of the resultant tubular resin absorbent material, and may cause an impediment in covering a plastic film over the outer surface of the tubular resin absorbent material. Thus, a sealing process or an air-tight sealing process is difficult to perform on the tubular resin absorbent material with a plastic film unless any processing is added to the sewing margin.

OBJECT AND SUMMARY OF THE INVENTION

The present invention has been made in view of the problems mentioned above, and it is an object of the invention to provide a method of manufacturing a pipe liner bag which is capable of reducing a time required to join both ends of a resin absorbent material, and simplifying a sealing operation after the ends have been joined.

To achieve the above object, according to a first aspect, the present invention provides a method of manufacturing a pipe liner bag comprising a tubular resin absorbent material having an outer surface covered with a highly air-tight plastic film and a hardenable resin impregnated in the tubular resin absorbent material, the method comprising the steps of folding a strip-shaped resin absorbent material and aligning both ends thereof in the width direction; straight sewing overlapped portions to form a tubular resin absorbent material while leaving a sewing margin; turning the tubular resin absorbent material inside out such that a previous inner surface thereof appears outside; and welding or adhering a plastic film entirely or partially on the outer surface of the tubular resin absorbent material to air-tight seal the outer surface.

According to another aspect, the present invention provides a method of manufacturing a pipe liner bag comprising a tubular resin absorbent material having an outer surface covered with a highly air-tight plastic film and a hardenable resin impregnated in the tubular resin absorbent material, the method comprising the steps of folding a strip-shaped resin absorbent material having a surface thereof covered with a plastic film such that the plastic film is placed inside, and aligning both ends of the strip-shaped resin absorbent material in the width direction; straight sewing overlapped portions to form a tubular resin absorbent material while leaving a sewing margin; turning the tubular resin absorbent material inside out such that a previous inner surface thereof appears outside; and welding or adhering a sealing ribbon tape on the outer surface of the tubular resin absorbent material covering a joint to air-tight seal the outer surface.

Preferably, the sewing margin of the tubular resin absorbent material has been previously joined.

According to a further aspect, the present invention provides a method of manufacturing a pipe liner bag comprising a tubular resin absorbent material having an outer surface covered with a highly air-tight plastic film and a hardenable resin impregnated in the tubular resin absorbent material, the method comprising the steps of folding a strip-shaped resin absorbent material and abutting both ends in a width direction of the strip-shaped resin absorbent material; welding or adhering a joint reinforcing tape on abutted ends to form a tubular resin absorbent material; turning the tubular resin absorbent material inside out such that a previous inner surface thereof appears outside; and welding or adhering a sealing ribbon tape on the outer surface of the tubular resin absorbent material covering a joint to air-tight seal the outer surface.

According to a further aspect, the present invention provides a method of manufacturing a pipe liner bag comprising a tubular resin absorbent material having an outer surface covered with a highly air-tight plastic film and a hardenable resin impregnated in the tubular resin absorbent material, the method comprising the steps of folding a strip-shaped resin absorbent material having a surface thereof covered with a plastic film, and abutting both ends in a width direction of the strip-shaped resin absorbent material; welding or adhering a joint reinforcing tape on abutted ends of the strip-shaped resin absorbent material to form a tubular resin absorbent material; turning the tubular resin absorbent material inside out such that a previous inner surface thereof appears outside; and welding or adhering a sealing ribbon tape on the outer surface of the tubular resin absorbent material covering a joint to airtight seal the outer surface.

In the methods set forth above, a joint clearance tape may be interposed between the sealing ribbon tape and the plastic film.

Also, the sealing ribbon tape and the plastic film may be made of a film of the same material, and a fabric member may be sandwiched between the sealing ribbon tape and the tubular resin absorbent material.

The joint reinforcing tape is preferably made of an unwoven fabric.

Those and other objects, features and advantages of the present invention will become more apparent from the following description of the preferred embodiment of the present invention, taken in conjunction with the accompanying drawings.

DESCRIPTION OF THE PREFERRED EMBODIMENTS

The present invention will hereinafter be described in connection with several preferred embodiments thereof with reference to the accompanying drawings.

<Embodiment 1>

FIGS. 1 to 5 illustrate in order various steps in a method of manufacturing a pipe liner bag according to a first embodiment of the present invention.

Figure 1:
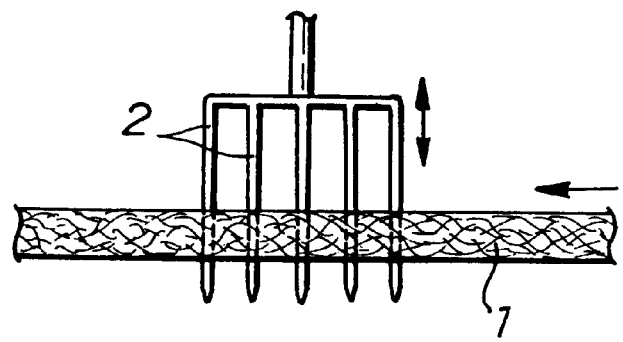
FIGS. 1 to 5 are partial perspective views of a tubular resin absorbent material illustrating in order various steps in a method of manufacturing a pipe liner bag according to a first embodiment of the present invention.

The manufacturing method according to the first embodiment of the present invention employs a needle punching for manufacturing a strip-shaped resin absorbent material 1, as illustrated in FIG. 1. Specifically, in a needle punching process, several sheets made of fibers such as polyester, acrylic, vinylon or the like are stacked. The fibers may have a thickness in a range of 3 to 15 deniers. Then, the stack is punched with a large number of vertically movable needles 2 while being moved in a direction indicated by a right-hand arrow in FIG. 1 at a predetermined speed, thereby fabricating a strip-shaped unwoven fabric with a weight ranging from 500 g/m$^2$ to 1200 g/m$^2$, of which a resin absorbent material 1 is made. To enhance the strength of the resultant resin absorbent material, glass fiber, carbon fiber, Kepler fiber or the like may be mixed in the unwoven fabric.

It has been confirmed that in the needle punching process, needles are drawn out with more difficulties on the opposite side of the unwoven fabric from which the needles 2 project than the upper side of the unwoven fabric into which the needles 2 are penetrated.

Figure 2:
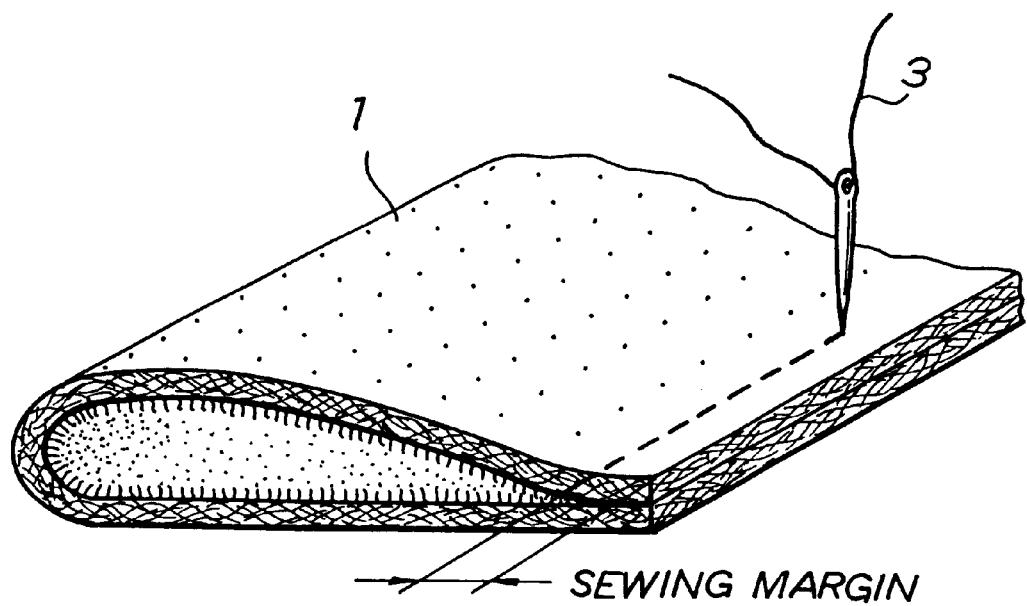

In the next step, therefore, the tubular resin absorbent material (unwoven fabric) 1, resulting from the needle punching, is folded such that the surface, from which the needles 2 have projected, is placed inside, both ends in the width direction are aligned, and the overlapped portions are joined by straight sewing with a sewing margin 1a being left over an appropriate width from the end, as illustrated in FIG. 2. A material for a sewing yarn 3 for use in this straight sewing may include nylon, polyester, Kepler, ceramic or the like. It should be understood however that the material for the sewing yarn 3 is not a limitation to the present invention.

Figure 3:
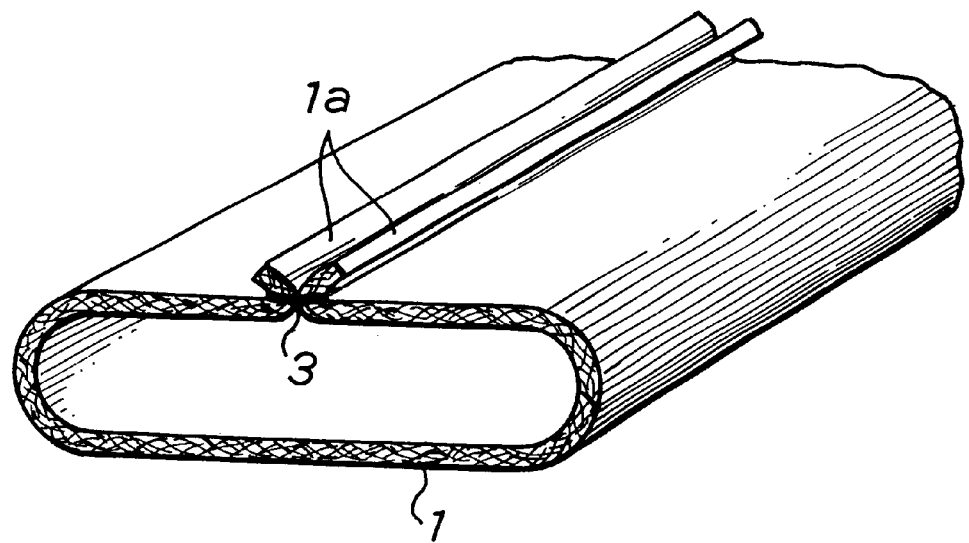

After the overlapped portions of the resin absorbent material 1 have been joined by straight sewing as mentioned above, the joint is stretched in the left-to-right direction to form the tubular resin absorbent material 1 as illustrated in FIG. 3. The resulting tubular resin absorbent material 1 has the sewing margin 1a appearing on the outer surface of the joint.

Then, the tubular resin absorbent material 1 is turned inside out, causing the surface of the resin absorbent material 1, from which the needles 2 have projected during the needle punching process (from which the needles 2 are drawn out with more difficulties), to appear outside, with the sewing margin 1a positioned inside.

Now, specific methods of turning the resin absorbent material 1 inside out will be described with reference to FIGS. 6 and 7.

Figure 6A:
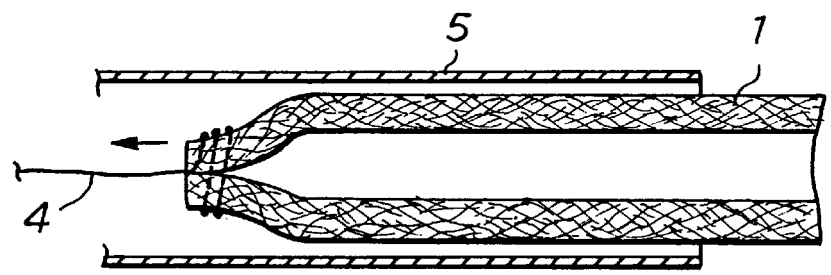
FIGS. 6A and 6B are partial cross-sectional views for showing a method of turning a tubular resin absorbent material inside out.
Figure 6B:
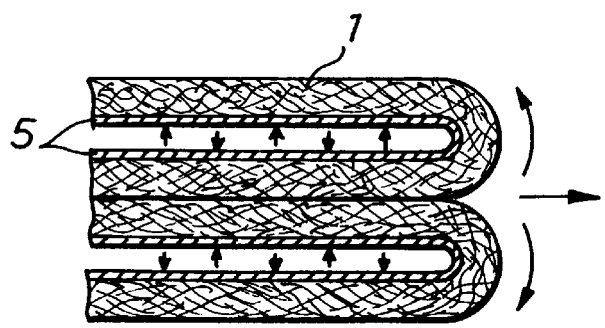

A first method, illustrated in FIGS. 6A and 6B, involves tying a pull rope 4 on an end portion of the tubular resin absorbent material 1 illustrated in FIG. 3, pulling the pull rope 4 in a direction indicated by an arrow in FIG. 6A to draw the tubular resin absorbent material 1 into an opaque tube 5, and applying a fluid pressure to the opaque tube 5 to evert the resin absorbent material 1 as illustrated in FIG. 6B.

Figure 7A:
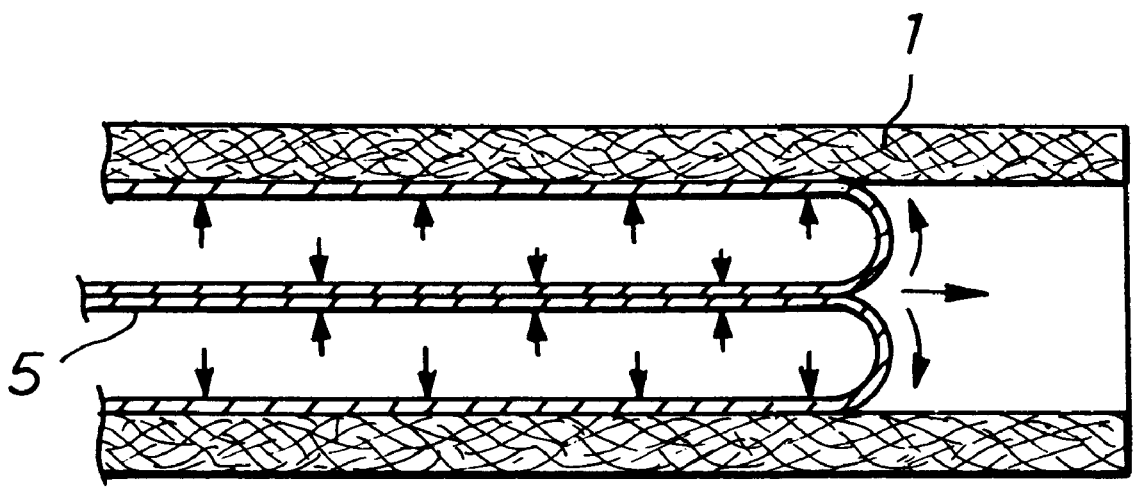
FIGS. 7A and 7B are partial cross-sectional views for showing another method of turning a tubular resin absorbent material inside out.
Figure 7B:
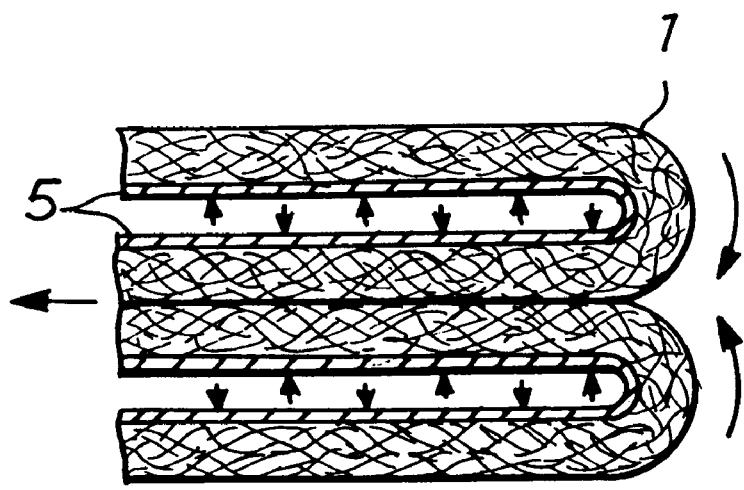

A second method, illustrated in FIGS. 7A and 7B, involves everting and inserting an opaque tube 5 into the tubular resin absorbent material 1 with a fluid pressure as illustrated in FIG. 7A, and simultaneously inverting the opaque tube 5 and the tubular resin absorbent material 1 to turn them together inside out as illustrated in FIG. 7B.

Figure 4:
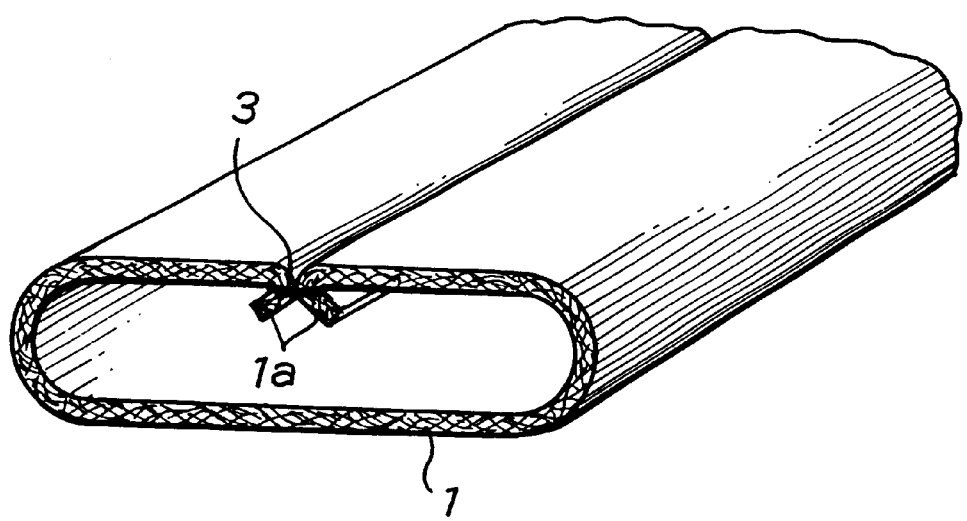
Figure 5:
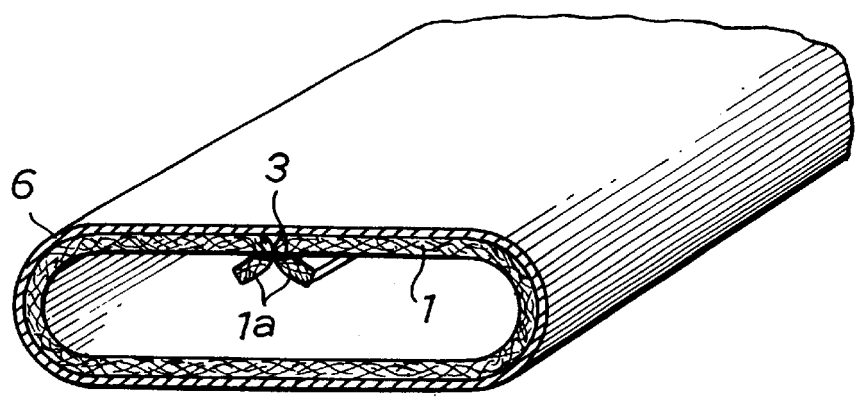

As the tubular resin absorbent material 1 has been turned inside out as illustrated in FIG. 4, a highly air-tight plastic film 6 is welded or adhered over the entire outer surface of the tubular resin absorbent material 1 as illustrated in FIG. 5, and the joint of the tubular resin absorbent material 1 is also air-tight sealed by the plastic film 6. Here, since the outer surface of the resin absorbent material 1 is the side from which the needles 2 (see FIG. 1) have projected during the needle punching process as mentioned above, and fibers on the outer surface are more difficult for the needles to be drawn out than those on the inner surface, the plastic film 6 is more strongly welded or adhered on this outer surface. A material for use as the plastic film 6 may be a composite film including polyurethane, nylon, EVOH or the like which is highly resistant to styrene.

After the joint of the tubular resin absorbent material 1 has been air-tight sealed with the plastic film 6 as illustrated in FIG. 5 through the foregoing steps, the tubular resin absorbent material 1 is impregnated with an unhardened liquid hardenable resin by an arbitrary method to complete a desired tubular liner bag which can serve for lining a defective or old pipe. The unhardened liquid hardenable resin impregnated in the tubular resin absorbent material 1 may be a light hardenable resin, a cold hardenable resin, and so on as well as a thermosetting resin such as unsaturated polyester resin, an epoxy resin, vinyl ester resin or the like.

As described above, since the manufacturing method according to the first embodiment joins overlapped end portions of the strip-shaped resin absorbent material 1 by straight sewing, a time required for the joining step can be reduced as compared with a conventional method which employs lock sewing for the joining step.

In addition, since the sewing margin 1a resulting from the straight sewing of the strip-shaped resin absorbent material 1 is positioned inside the tubular resin absorbent material 1 by turning the tubular resin absorbent material 1 inside out, a sealing operation after the overlapped portions have been joined can be simplified because the sewing margin 1a will never prevent the subsequently applied plastic film 6 from sealing the joint.

Figure 8:
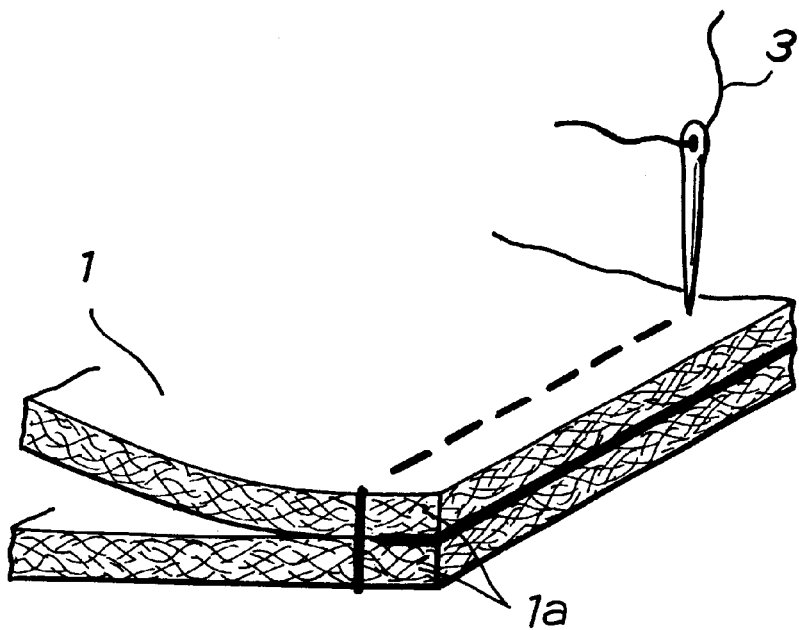
FIG. 8 is a partial perspective view of a resin absorbent material for showing an exemplary modification to the method of manufacturing a pipe liner bag according to the first embodiment.
Figure 9:
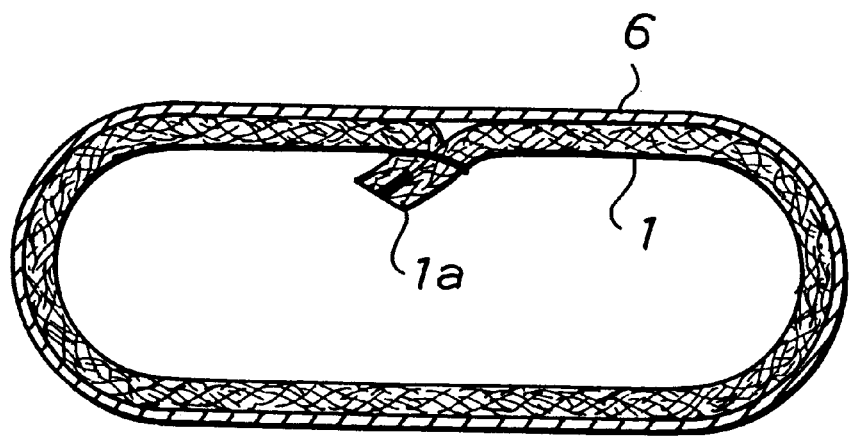
FIG. 9 is a cross-sectional view of the resin absorbent material for showing the exemplary modification to the method of manufacturing a pipe liner bag according to the first embodiment.
Figure 10:
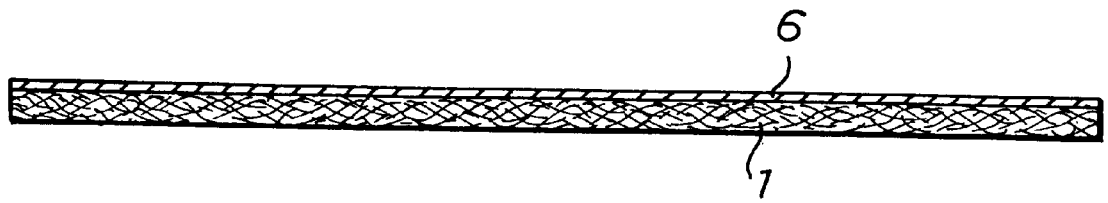
FIGS. 10 to 15 are partial perspective views illustrating in order various steps in a method of manufacturing a pipe liner bag according to a second embodiment of the present invention.

Advantageously, if both ends of the sewing margin 1a have been previously joined before the straight sewing performed for the strip-shaped resin absorbent material 1 as illustrated in FIG. 8, the sewing margin 1a, positioned inside when the tubular resin absorbent material 1 is turned inside out, will not separate into two sides but draw one side as illustrated in FIG. 9.

<Embodiment 2>

Next, a method of manufacturing a pipe liner bag according to a second embodiment of the present invention will be described with reference to FIGS. 10 to 15.

FIGS. 10 to 15 illustrate in order various steps in a method of manufacturing a pipe liner bag according to the second embodiment of the present invention.

Figure 11:
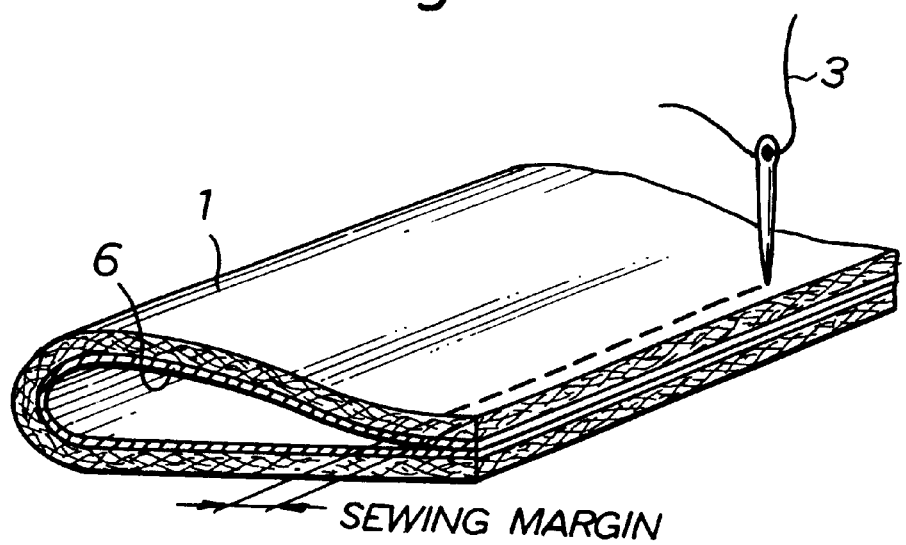

In the manufacturing method according to the second embodiment, a strip-shaped resin absorbent material 1 having one surface covered with a highly air-tight plastic film 6 is folded such that the plastic film 6 is placed inside, as illustrated in FIG. 11, both ends in the width direction of the strip-shaped resin absorbent material 1 are aligned, and overlapped portions are joined by straight sewing with a sewing margin 1a being left over an appropriate width from the end.

Figure 12:
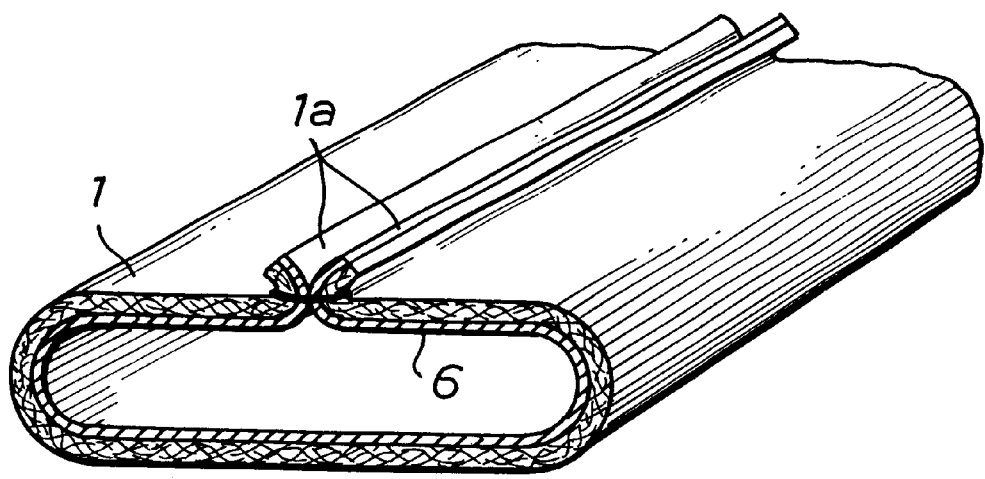

After the overlapped portions of the resin absorbent material 1 have been joined by straight sewing as mentioned above, the joint is stretched in the left-to-right direction to form the tubular resin absorbent material 1 as illustrated in FIG. 12. The tubular resin absorbent material 1 has the sewing margin 1a appearing on the outer surface of the joint and the plastic film 6 positioned on the inner surface.

Figure 13:
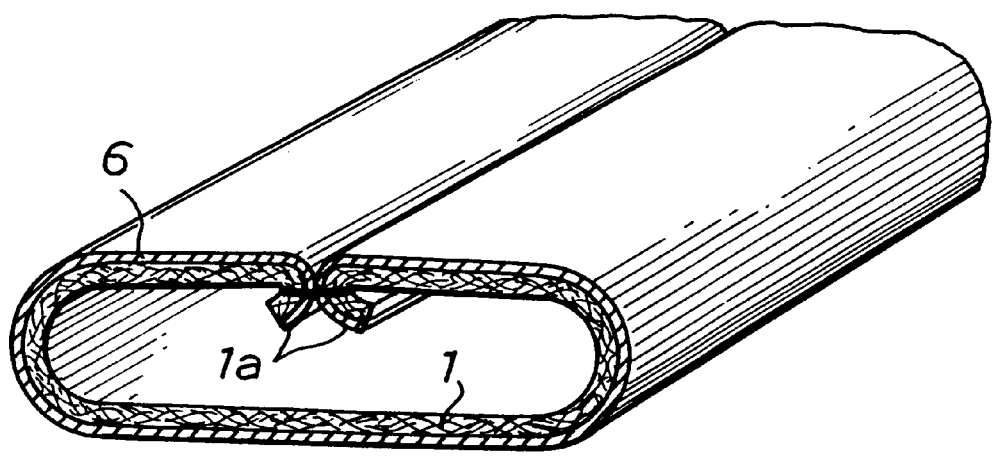

Then, the tubular resin absorbent material 1 is turned inside out by any of the foregoing methods (see FIGS. 6 and 7), causing the plastic film 6 of the resin absorbent material 1 to appear outside, with the sewing margin 1a positioned inside, as can be seen in FIG. 13.

Figure 14:
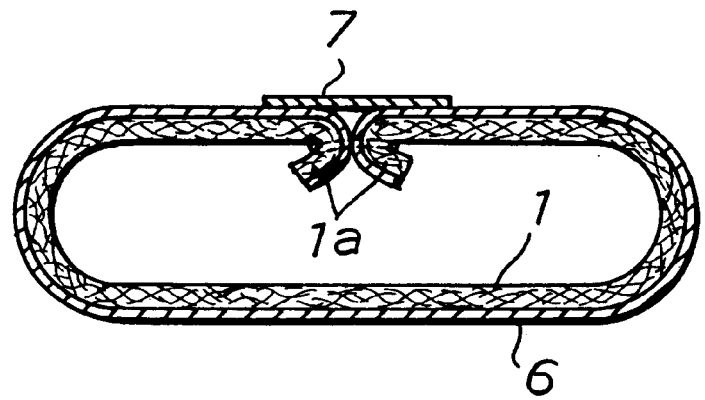

Subsequently, a sealing ribbon tape 7 is welded or adhered on the outer surface of the joint (sewed portion) of the tubular resin absorbent material 1 having the outer surface covered with the plastic film 6, as illustrated in FIG. 14, to provide the joint with an air-tight sealing feature. Preferably, a film made of the same material as the plastic film 6 is used for the sealing ribbon tape 7.

Figure 15:
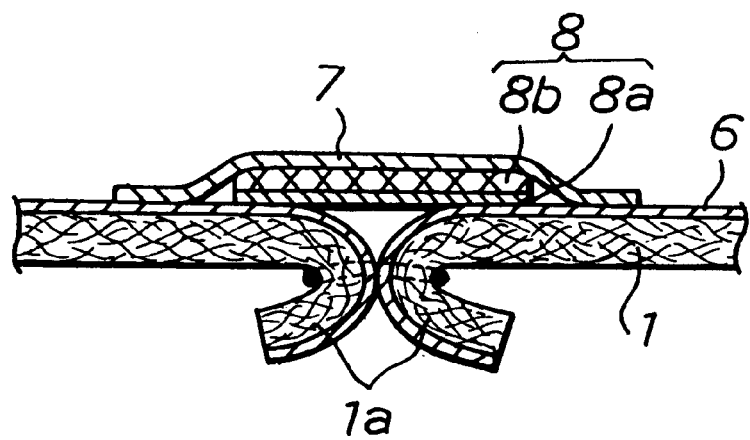

Alternatively, as illustrated in FIG. 15, a joint clearance tap 8, which does not weld or adhere to the sealing ribbon tape 7, is welded or adhered on the outer surface of the joint (sewed portion) of the tubular resin absorbent material 1. Then, a sealing ribbon tape 7 having a wider width is further overlaid on the joint clearance tape 8, with both side portions of the sealing ribbon tape 7 extending from the side edges of the joint clearance tape 8. The side portions of the sealing ribbon tape 7 extending from both edges of the joint clearance tape 8 are welded or adhered to the plastic film 6 to air-tight seal the joint (sewed portion) of the tubular resin absorbent material 1. The joint clearance tap 8 is formed of a plastic film 8a and an overlying fabric material 8b, so that the plastic film 8a is welded or adhered to the plastic film 6 which covers the outer surface of the tubular resin absorbent material 1.

After the joint of the tubular resin absorbent material 1 has been air-tight sealed with the sealing ribbon tape 7 as illustrated in FIG. 14 or with the sealing ribbon tape 7 and the joint clearance tape 8 as illustrated in FIG. 15 through the foregoing steps, the tubular resin absorbent material 1 is impregnated with an unhardened liquid hardenable resin by an arbitrary method to complete a desired tubular liner bag which can serve for lining a defective or old pipe.

As described above, since the manufacturing method according to the second embodiment joins overlapped end portions of the strip-shaped resin absorbent material 1 by straight sewing in a manner similar to the aforementioned first embodiment, a time required for the joining step can be reduced as compared with a conventional method which employs lock sewing for the joining step.

In addition, since the sewing margin 1a resulting from the straight sewing of the strip-shaped resin absorbent material 1 is positioned inside the tubular resin absorbent material 1 by turning the tubular resin absorbent material 1 inside out, a sealing operation after the overlapped portions have been joined can be simplified because the sewing margin 1a will never prevent the subsequently applied sealing ribbon tape 7 or the like from sealing the joint.

<Embodiment 3>

Next, a method of manufacturing a pipe liner bag according to a third embodiment will be described with reference to FIGS. 16 to 21. FIGS. 16 to 21 illustrate in order various steps in a method of manufacturing a pipe liner bag according to the third embodiment of the present invention.

Figure 16:
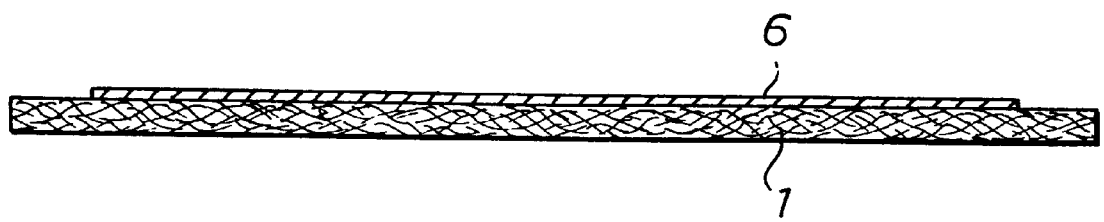
FIGS. 16 to 21 are partial perspective views illustrating in order various steps in a method of manufacturing a pipe liner bag according to a third embodiment of the present invention.
Figure 17:
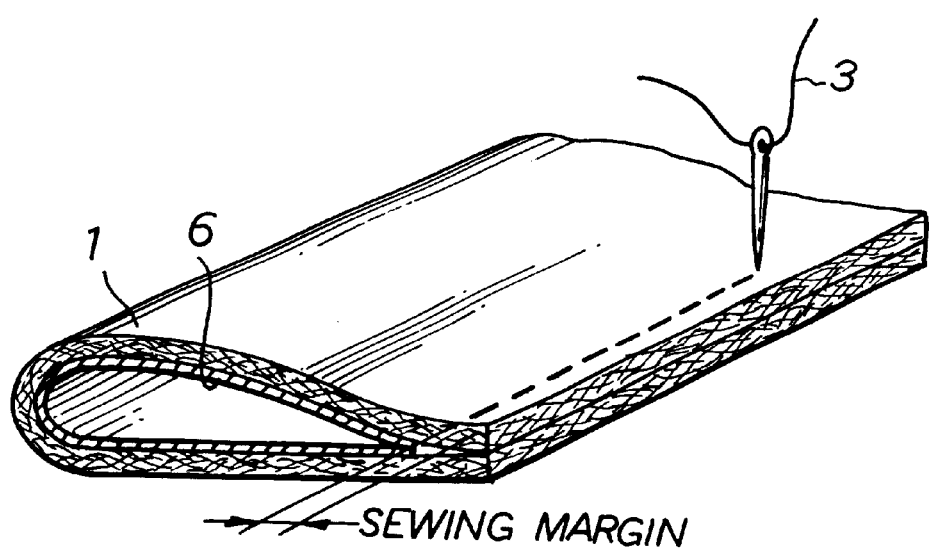

In the manufacturing method according to the third embodiment, a strip-shaped resin absorbent material 1 having one surface covered with a highly air-tight plastic film 6 except for both end portions thereof, as illustrated in FIG. 16, is folded such that the plastic film 6 is placed inside, as illustrated in FIG. 17, both ends in the width direction are aligned, and overlapped portions are joined by straight sewing with a sewing margin 1a being left over an appropriate width from the end.

Figure 18:
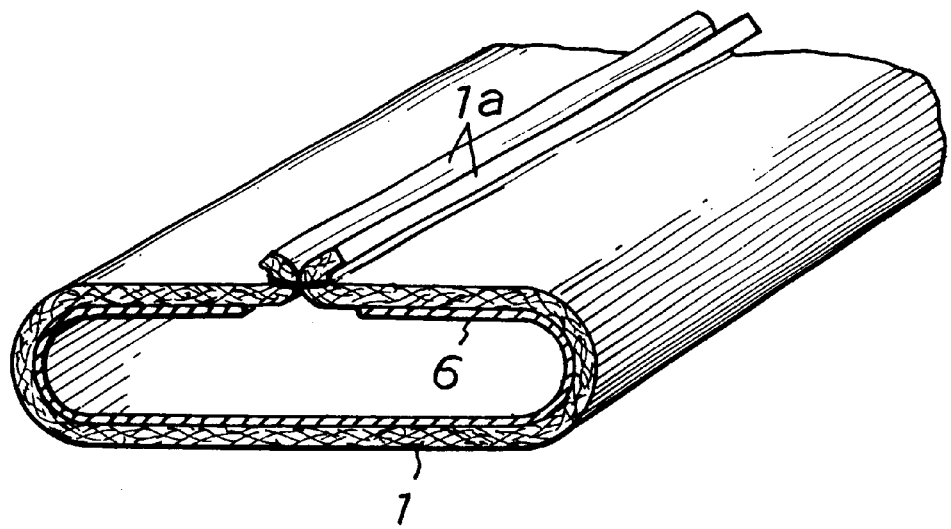

After the overlapped portions of the resin absorbent material 1 have been joined by straight sewing as mentioned above, the joint is stretched in the left-to-right direction to form the tubular resin absorbent material 1 as illustrated in FIG. 18. The tubular resin absorbent material 1 has the sewing margin 1a appearing on the outer surface of the joint and the plastic film 6 positioned on the inner surface, a portion of the inner surface covered with the plastic film 6, and a constant width portion not covered with the plastic film 6 along the joint (hereinafter referred to as the "non-covered portion).

Figure 19:
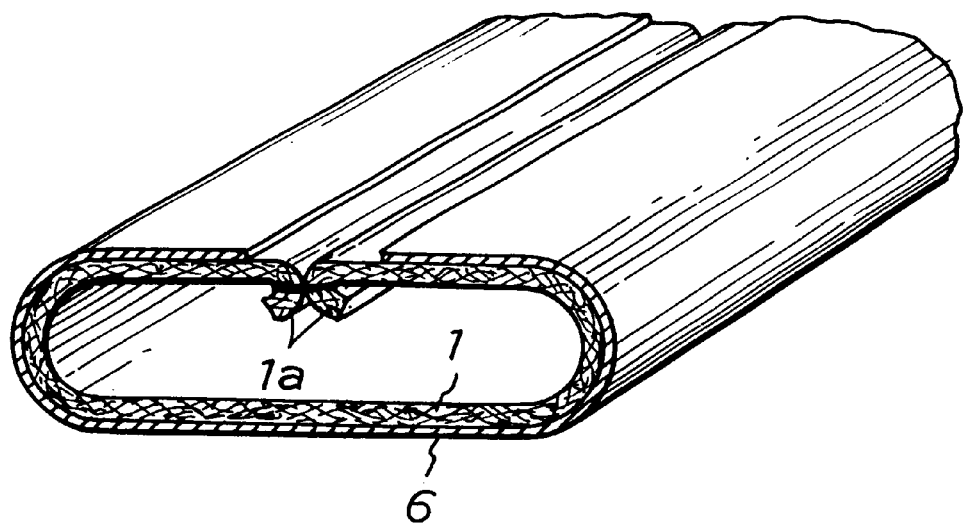

Then, the tubular resin absorbent material 1 is turned inside out by any of the foregoing methods (see FIGS. 6 and 7), causing the plastic film 6 of the resin absorbent material 1 to appear outside, with the sewing margin 1a positioned inside, as can be seen in FIG. 19.

Figure 20:
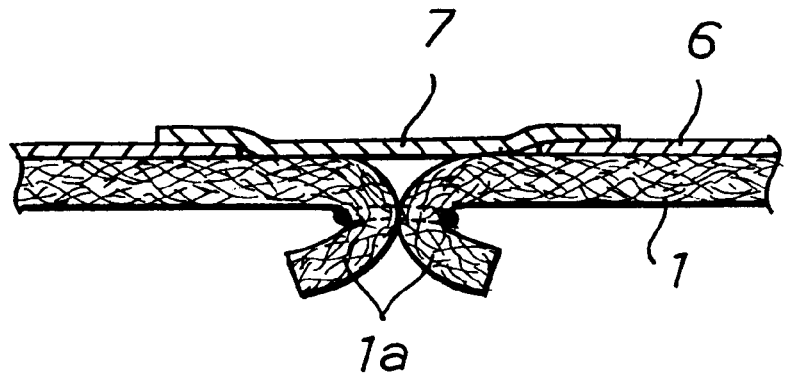
Figure 21:
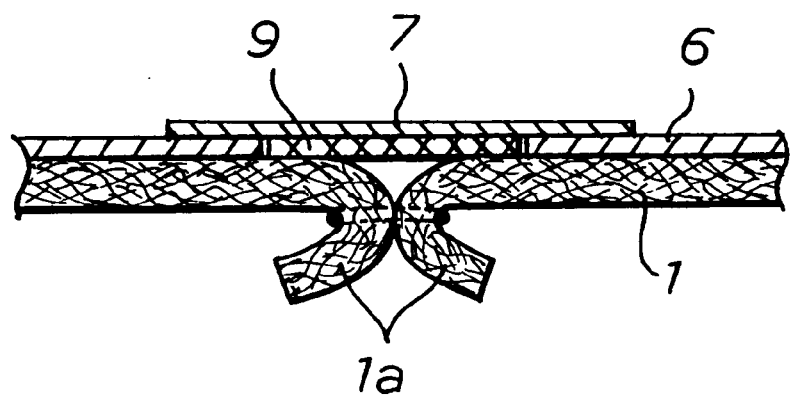

Subsequently, a sealing ribbon tape 7 having a width wider than that of the non-covered portion is welded or adhered on a region including the non-covered portion on the outer surface of the joint (sewed portion) of the tubular resin absorbent material 1, as illustrated in FIG. 20, to provide the joint with an air-tight sealing feature. Alternatively, as illustrated in FIG. 21, a fabric member 9 made of an unwoven fabric is fitted into and welded or adhered on the non-covered portion on the outer surface of the tubular resin absorbent material 1. Then, a sealing ribbon tape 7 having a wider width is further overlaid on the fabric member 9, with both side portions of the sealing ribbon tape 7 welded or adhered to the plastic film 6 to air-tight seal the joint. The fabric member 9 may be previously joined to the sealing ribbon tape 7.

After the joint of the tubular resin absorbent material 1 has been air-tight sealed with the sealing ribbon tape 7 as illustrated in FIG. 20 or with the sealing ribbon tape 7 and the fabric member 9 as illustrated in FIG. 21 through the foregoing steps, the tubular resin absorbent material 1 is impregnated with an unhardened liquid hardenable resin by an arbitrary method to complete a desired tubular liner bag which can serve for lining a defective or old pipe.

As described above, since the manufacturing method according to the third embodiment joins overlapped end portions of the strip-shaped resin absorbent material 1 by straight sewing in a manner similar to the aforementioned first and second embodiments, a time required for the joining step can be reduced as compared with a conventional method which employs lock sewing for the joining step.

In addition, since the sewing margin 1a resulting from the straight sewing of the strip-shaped resin absorbent material 1 is positioned inside the tubular resin absorbent material 1 by turning the tubular resin absorbent material 1 inside out, a sealing operation after the overlapped portions have been joined can be simplified because the sewing margin 1a will never prevent the subsequently applied sealing ribbon tape 7 or the like from sealing the joint.

<Embodiment 4>

Figure 22:
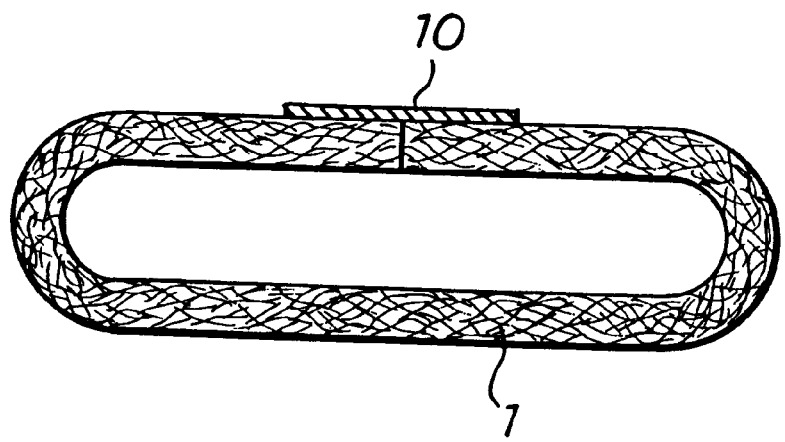
FIGS. 22 to 24 are partial perspective views illustrating in order various steps in a method of manufacturing a pipe liner bag according to a fourth embodiment of the present invention.
Figure 23:
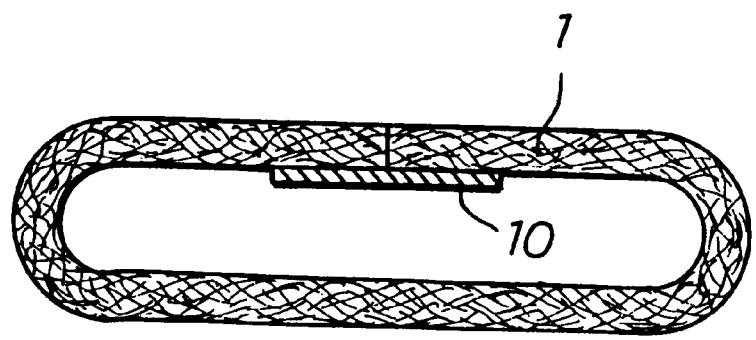
Figure 24:
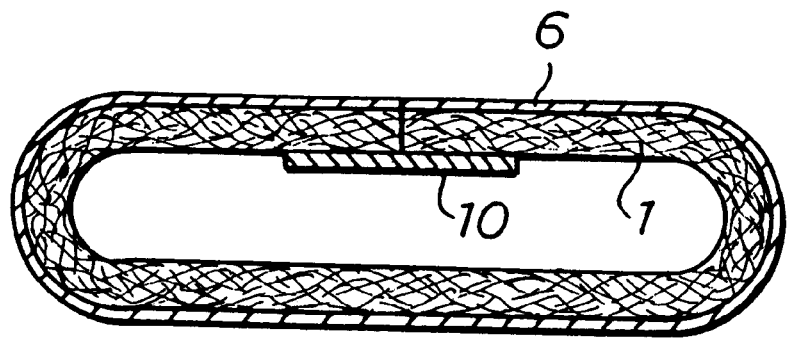

Next, a method of producing a pipe liner bag according to a fourth embodiment of the present invention will be described with reference to FIGS. 22 to 24. FIGS. 22 to 24 illustrate in order various steps in a method of manufacturing a pipe liner bag according to the fourth embodiment of the present invention.

In the manufacturing method according to the fourth embodiment, both ends of a strip-shaped resin absorbent material 1 are abutted as illustrated in FIG. 22, and a joint reinforcing tape 10 is welded or adhered on the outer surface of the resin absorbent material 1 over the abutted ends to make the resin absorbent material 1 tubular. For the joint reinforcing tape 10, an unwoven fabric made of the same material as the resin absorbent material 1 is preferably used.

Then, the tubular resin absorbent material 1 is turned inside out by any of the foregoing methods (see FIGS. 6 and 7), causing the inner surface of the resin absorbent material 1 to appear outside, with the result that the joint reinforcing tape 10 is positioned on the inner surface of the reversed tubular resin absorbent material 1, as illustrated in FIG. 23. Subsequently, a highly air-tight plastic film 6 is welded or adhered over the entire outer surface of the tubular resin absorbent material 1, as illustrated in FIG. 24, to provide the joint with an air-tight sealing feature. Also, in the fourth embodiment, the outer surface of the tubular resin absorbent material 1 is the side through which the needles 2 have been projected in the needle punching process (see FIG. 1). Since fibers on the outer surface are more difficult for the needles to be drawn out than those on the inner surface, the plastic film 6 is more strongly welded or adhered on this outer surface.

After the joint of the tubular resin absorbent material 1 has been air-tight sealed with the plastic film 6 as illustrated in FIG. 24 through the foregoing steps, the tubular resin absorbent material 1 is impregnated with an unhardened liquid hardenable resin by an arbitrary method to complete a desired tubular liner bag which can serve for lining a defective or old pipe.

As described above, since the manufacturing method according to the fourth embodiment welds or adheres the joint reinforcing tape 10 on the outer surface covering the abutted ends of the strip-shaped resin absorbent material 1 to join the abutted ends, a time required for the joining step can be reduced as compared with a conventional method which employs lock sewing for the joining step.

In addition, since the joint reinforcing tape 10 welded or adhered on the outer surface of the strip-shaped resin absorbent material 1 covering the abutted ends is positioned inside the tubular resin absorbent material 1 by turning the tubular resin absorbent material 1 inside out, a sealing operation after the abutted ends have been joined can be simplified because the joint reinforcing tape 10 will never prevent the subsequently applied plastic film 6 from sealing the joint.

<Embodiment 5>

Next, a method of manufacturing a pipe liner bag according to a fifth embodiment of the present invention will be described with reference to FIGS. 25 to 28. FIGS. 25 to 28 illustrate in order various steps in a method of manufacturing a pipe liner bag according to the fifth embodiment of the present invention.

Figure 25:
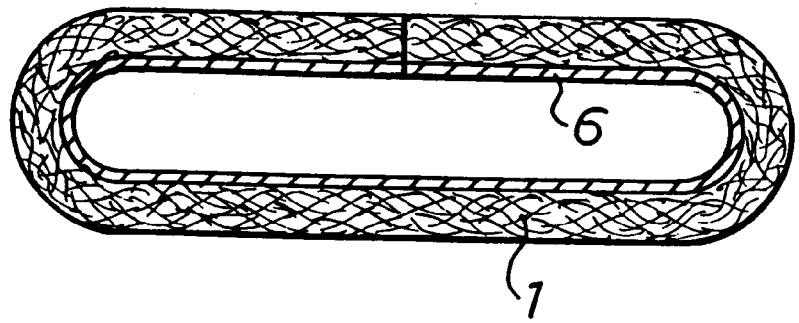
FIGS. 25 to 29 are partial perspective views illustrating in order various steps in a method of manufacturing a pipe liner bag according to a fifth embodiment of the present invention.
Figure 26:
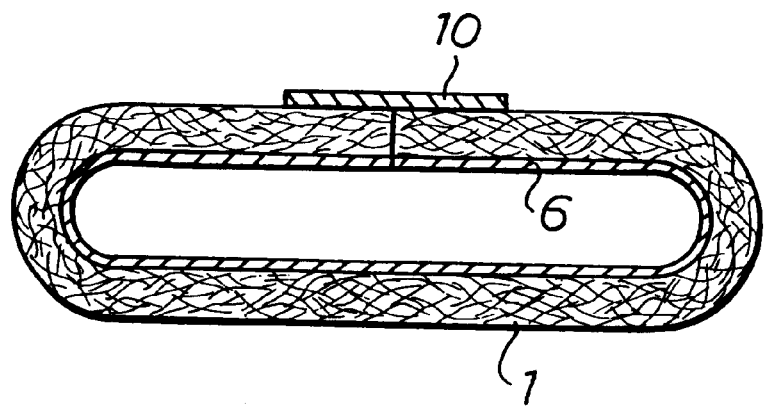

In the manufacturing method according to the fifth embodiment, both ends in the width direction of a strip-shaped resin absorbent material 1 having one surface covered with a plastic film 6 are abutted such that the plastic film 6 is placed inside as illustrated in FIG. 25, and a joint reinforcing tape 10 is welded or adhered on the outer surface of the resin absorbent material 1 over the abutted ends to make the resin absorbent material 1 tubular as illustrated in FIG. 26.

Figure 27:
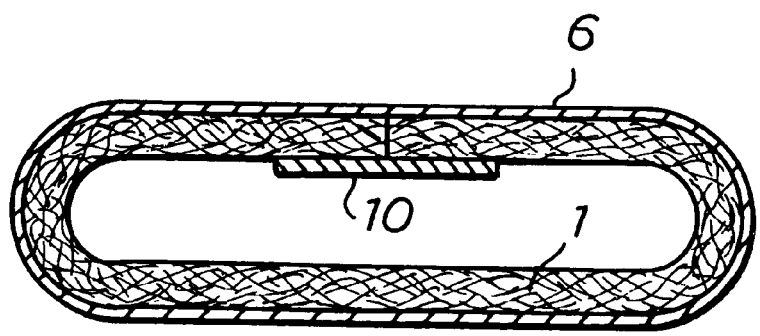

Then, the tubular resin absorbent material 1 is turned inside out by any of the foregoing methods (see FIGS. 6 and 7), with the result that the joint reinforcing tape 10 is positioned on the inner surface of the reversed tubular resin absorbent material 1, and the plastic film 6 appears outside, as illustrated in FIG. 27.

Figure 28:
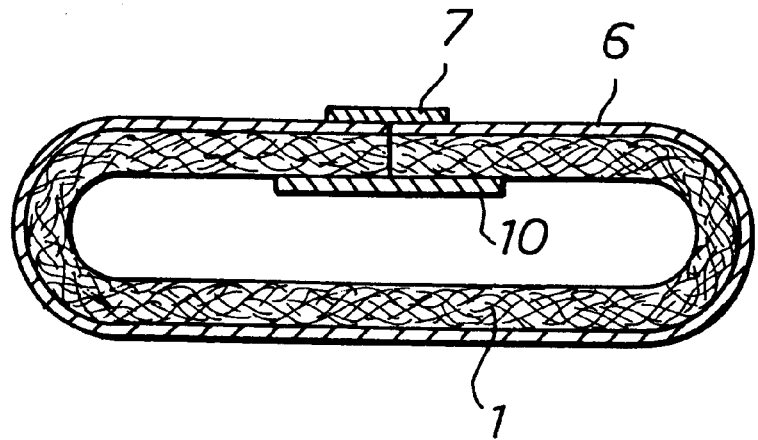
Figure 29:
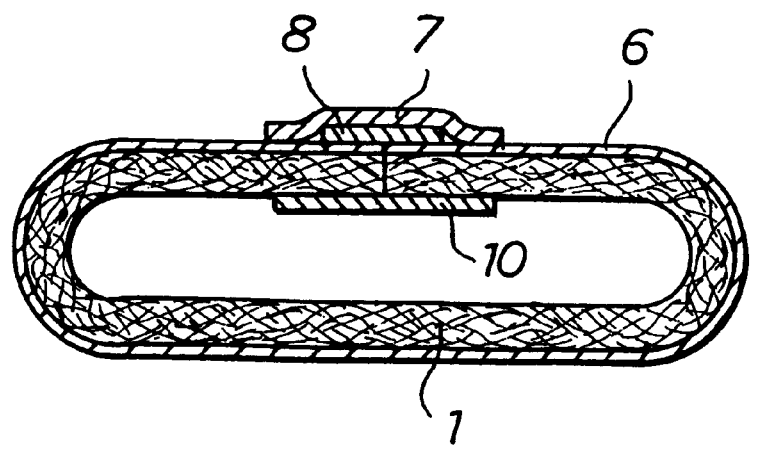

Subsequently, a sealing ribbon tape 7 is welded or adhered on the outer surface including the joint or the abutted ends of the tubular resin absorbent material 1, as illustrated in FIG. 28, to air tight seal the joint with the sealing ribbon tape 7. Alternatively, as illustrated in FIG. 29, a joint clearance tap 8 is welded or adhered on the outer surface including the joint of the tubular resin absorbent material 1. Then, a sealing ribbon tape 7 having a wider width is further overlaid on the joint clearance tape 8, with both side portions of the sealing ribbon tape 7 extending from the side edges of the joint clearance tape 8. The side portions of the sealing ribbon tape 7 extending from both edges of the joint clearance tape 8 are welded or adhered to the plastic film 6 to air-tight seal the joint of the tubular resin absorbent material 1.

After the joint of the tubular resin absorbent material 1 has been air-tight sealed with the plastic film 6 through the foregoing steps, the tubular resin absorbent material 1 is impregnated with an unhardened liquid hardenable resin by an arbitrary method to complete a desired tubular liner bag which can serve for lining a defective or old pipe.

As described above, since the manufacturing method according to the fifth embodiment welds or adheres the joint reinforcing tape 10 on the outer surface covering the abutted ends of the strip-shaped resin absorbent material 1 to join the abutted ends, a time required for the joining step can be reduced as compared with a conventional method which employs lock sewing for the joining step.

In addition, since the joint reinforcing tape 10 welded or adhered on the outer surface of the strip-shaped resin absorbent material 1 covering the abutted ends is positioned inside the tubular resin absorbent material 1 by turning the tubular resin absorbent material 1 inside out, a sealing operation after the abutted ends have been joined can be simplified because the joint reinforcing tape 10 will never prevent the subsequently applied sealing ribbon tape 7 or the like from sealing the joint.

As will be apparent from the foregoing description, according to the manufacturing methods of the present invention, overlapped end portions of a strip-shaped resin absorbent material are joined by straight sewing, or a joint reinforcing tape is welded or adhered on the outer surface covering abutted ends of a strip-shaped resin absorbent material to join the abutted ends, so that a time required for the joining step can be reduced as compared with a conventional method which employs lock sewing for the joining step.

In addition, since a sewing margin resulting from the straight sewing of the strip-shaped resin absorbent material is positioned inside the tubular resin absorbent material by turning the tubular resin absorbent material inside out, a sealing operation after the overlapped portions have been joined can be simplified because the sewing margin will never prevent a subsequently applied plastic film from sealing the joint. Alternatively, since a joint reinforcing tape welded or adhered on the outer surface of the strip-shaped resin absorbent material covering abutted ends is positioned inside the tubular resin absorbent material by turning the tubular resin absorbent material inside out, a sealing operation after the abutted ends have been joined can be simplified because the joint reinforcing tape will never prevent the subsequently applied plastic film or the like from sealing the joint.

While the present invention has been described in connection with its preferred embodiments, it is to be understood that various modifications will occur to those skilled in the art without departing from the spirit and scope of the invention. The scope of the present invention is therefore to be determined solely by the appended claims.

What is claimed is:

1. A method of manufacturing a pipe liner bag comprising a tubular resin absorbent material having an outer surface covered with a highly air-tight plastic film and a hardenable resin impregnated in said tubular resin absorbent material, said method comprising the steps of:

folding a strip-shaped resin absorbent material and aligning both ends thereof in the width direction;

straight sewing overlapped portions to form a tubular resin absorbent material while leaving a sewing margin;

turning said tubular resin absorbent material inside out such that a previous inner surface thereof appears outside; and affixing a plastic film at least partially on the outer surface of said tubular resin absorbent material to air-tight seal said outer surface.

2. A method of manufacturing a pipe liner bag according to claim 1, wherein said sewing margin of said tubular resin absorbent material has been previously joined.

3. A method of manufacturing a pipe liner bag comprising a tubular resin absorbent material having an outer surface covered with a highly air-tight plastic film and a hardenable resin impregnated in said tubular resin absorbent material, said method comprising the steps of:

folding a strip-shaped resin absorbent material having a surface thereof covered with a plastic film such that said plastic film is placed inside, and aligning both ends of said strip-shaped resin absorbent material in the width direction;

straight sewing overlapped portions to form a tubular resin absorbent material while leaving a sewing margin;

turning said tubular resin absorbent material inside out such that a previous inner surface thereof appears outside; and affixing a sealing ribbon tape on the outer surface of said tubular resin absorbent material covering a joint to air-tight seal said outer surface.

4. A method of manufacturing a pipe liner bag according to claim 3, wherein a joint clearance tape is interposed between said sealing ribbon tape and said plastic film.

5. A method of manufacturing a pipe liner bag according to claim 3, wherein said sealing ribbon tape and said plastic film are made of a film of the same material, and a fabric member is sandwiched between said sealing ribbon tape and said tubular resin absorbent material.

6. A method of manufacturing a pipe liner bag according to claim 3, wherein said sewing margin of said tubular resin absorbent material has been previously joined.

\* \* \* \* \*